US012041068B2

(12) United States Patent
Bernholz et al.

(10) Patent No.: US 12,041,068 B2
(45) Date of Patent: Jul. 16, 2024

(54) SYSTEM AND METHOD FOR CYBERSECURITY OPERATIONS THREAT MODELING

(71) Applicant: JPMORGAN CHASE BANK, N.A., New York, NY (US)

(72) Inventors: Daniel L. Bernholz, Long Island City, NY (US); Jean-Francois Legault, Brooklyn, NY (US); Patrick M. Ward, North Caldwell, NJ (US); Joshuah T. Sowers, Geneva, IL (US); Samuel A. Guthrie, Chattanooga, TN (US); Brett Wallace, Avondale, PA (US); Marcus Milligan, Newark, DE (US); Lindsey Axilrod, New York, NY (US); Kirsten Wenzel, New York, NY (US); Ken H. Chung, Long Island, NY (US); Chee Peng Chang, Singapore (SG); Ross A. Knapp, London (GB); Emmanouil Vrentzos, Richmond (GB); Daniel Su, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 354 days.

(21) Appl. No.: 17/385,695

(22) Filed: Jul. 26, 2021

(65) Prior Publication Data
US 2022/0103581 A1   Mar. 31, 2022

(30) Foreign Application Priority Data
Jul. 27, 2020 (GR) .............................. 20200100445

(51) Int. Cl.
*G06F 21/60* (2013.01)
*H04L 9/40* (2022.01)

(52) U.S. Cl.
CPC ...... *H04L 63/1425* (2013.01); *H04L 63/1416* (2013.01); *H04L 63/1433* (2013.01)

(58) Field of Classification Search
CPC ............. H04L 63/1425; H04L 63/1416; H04L 63/1433; H04L 63/101; H04L 63/14; G06F 21/60
See application file for complete search history.

(56) References Cited

U.S. PATENT DOCUMENTS

| | | | | |
|---|---|---|---|---|
| 11,399,041 | B1 * | 7/2022 | Kannan | ............... H04L 63/1433 |
| 2017/0093904 | A1 * | 3/2017 | Ng | ........................... H04L 63/20 |
| 2019/0379678 | A1 * | 12/2019 | McLean | ............... G06F 16/285 |

\* cited by examiner

*Primary Examiner* — Quazi Farooqui
(74) *Attorney, Agent, or Firm* — GREENBERG TRAURIG LLP

(57) ABSTRACT

Systems and methods for cybersecurity operations threat modeling are disclosed. In one embodiment, a method may include: (1) receiving threat actor data and threat actor group data; (2) processing the threat actor data and the threat actor group data; (3) for each threat actor group, generating a threat actor group profile; (4) collecting operational data from an organizational system; (5) generating a threat model by applying the threat actor group profile to the operational data; and (6) deploying at least one countermeasure to the organizational system in response to the threat model.

20 Claims, 2 Drawing Sheets

SYSTEM AND METHOD FOR CYBERSECURITY OPERATIONS THREAT MODELING

RELATED APPLICATION

This application claims priority to, and the benefit of, Greek Patent Application Ser. No. 20200100445 filed Jul. 27, 2020, the disclosure of which is hereby incorporated, by reference, in its entirety.

BACKGROUND OF THE INVENTION

1. Field of the Invention

Embodiments relate generally to systems and methods for cybersecurity operations threat modeling.

2. Description of the Related Art

Cybersecurity teams often identify and prioritize cyber threats and associated cyber defenses for an organization. These teams, however, tend to be reactive to a threat, responding only after a threat has been identified, rather than be proactive, in which the threats are identified, and the defenses are put in place before the threat occurs. As such, many organizations have a goal of complying with threat policies.

SUMMARY OF THE INVENTION

Embodiments are directed to systems and methods for cybersecurity operations threat modeling. Embodiments may incorporate real-world intelligence and operations data into threat prioritization and may provide a more detailed level of granularity to drive defensive enhancements than traditional compliance-based controls.

Embodiments may assess and prioritize the threat to an organization by cyberthreat actors or groups of cyberthreat actors. Embodiments may focus on cyberthreat actors/groups and their intents and capabilities. The principal threat axis comes from state-sponsored cyber groups as well as organized cyber-criminal groups. Other threat actors/groups, such as lower-tier cyber-criminals and Hacktivists, may also be considered.

Embodiments may further include a "threat grid," which may be a scoring methodology and assessment technique, to profile and assess cyber threat actors/groups to create a threat score for each threat actors/groups assessed. Each threat actors/groups in the threat grid may be assessed on its technical capabilities as well as its intent to target the organization, its affiliates or business partners, similar organizations, etc.

The threat grid uses the concepts of the threat actor and the threat actor groups. The threat actors in the threat grid that are initially chosen for assessment may be from the well-known and widely accepted cyber threat actor groups in the industry. Occasionally, threat actors/groups, particularly those that are new or emerging threats, may not be recognized or named by the security industry. These new or emerging threat actors/groups may be added to the threat grid and the same methodology may be applied.

Any significant cyber incident involving a known cyber threat actor/group may result in a re-assessment of the particular threat actor profile and the threat grid may be updated accordingly.

Although the threat grid may not list all known threat actors, the embodiments allow for a prompt profiling and assessment of any desired threat actor group upon request or as needed.

Embodiments may be directed to a two-step process to assign a threat score to each threat actor or threat actor group. The first step is to create a profile of the threat actor or threat actor group, and the second step is to score the threat actor's or threat actor group's capabilities and projected intent based on the observed actions of the threat actor's or threat actor group's targeted victims. Based on the assessment, each threat actor or threat actor group may be categorized in a threat actor category.

According to an embodiment, a method for cybersecurity operations threat modeling may include: (1) receiving, by a threat assessment computer program, threat data comprising malicious cyber activity; (2) identifying, by the threat assessment computer program, a plurality of threat actor groups from the threat data, wherein each threat actor group may be associated with malicious cyber activity that is under common control of the threat actor group; (3) calculating, by the threat assessment computer program, a threat actor sophistication score for each of the plurality of threat actor groups; (4) calculating, by the threat assessment computer program, a key motivations and intent score for each of the plurality of threat actor groups; (4) calculating, by the threat assessment computer program, a final threat score based on the threat actor sophistication score and the key motivations and intent score for each of the plurality of threat actor groups; (5) ranking, by the threat assessment computer program, the plurality of threat actor groups based on their final threat scores; (6) prioritizing, by the threat assessment computer program, Tactics, Techniques and Procedures (TTPs) for the threat actor groups based on the ranking; (7) collecting, by the threat assessment computer program, operational data from an organizational system; (8) generating, by the threat assessment computer program, a threat model by applying the identified TTPs to the operational data; and (9) deploying, by the threat assessment computer program, at least one countermeasure to the organizational system based on the threat model.

In one embodiment, the threat data may be received from an internal source and/or an external source.

In one embodiment, the method may further include processing, by the threat assessment computer program, the threat data, wherein the processing deduplicates, enriches and/or normalizes the threat data.

In one embodiment, the final threat score may represent a threat level posed by the threat actor group.

In one embodiment, the method may further include categorizing, by the threat assessment computer program, the threat actor group into a threat actor group category, wherein each threat actor group category identifies a threat category and sophistication of the threat actor group.

In one embodiment, the threat actor sophistication score may be based on a level of technical sophistication of the threat actor group.

In one embodiment, the countermeasure may include at least one of a change in a control posture, a change in a policy, a hardware or software upgrade, a hardware or software patch, a network infrastructure or software change, and an access control list modification.

According to another embodiment, a method for cybersecurity operations threat modeling may include: (1) receiving, by a threat assessment computer program, threat data comprising malicious cyber activity; (2) identifying, by the threat assessment computer program, a plurality of threat actor groups from the threat data, wherein each threat actor group may be associated with malicious cyber activity that is under common control of the threat actor group; (3) categorizing, by the threat assessment computer program, each threat actor group into a threat actor group category; (4) prioritizing, by the threat assessment computer program, Tactics, Techniques and Procedures (TTPs) for the threat actor groups based on the categorization; (5) identifying, by the threat assessment computer program, a threat actor group category of interest; (6) collecting, by the threat assessment computer program, operational data from an organizational system; (7) generating, by the threat assessment computer program, a threat model by applying the identified TTPs to the operational data; and (8) deploying, by the threat assessment computer program, at least one countermeasure to the organizational system based on the identified threat actor group category.

In one embodiment, the threat data may be received from an internal source and/or an external source.

In one embodiment, the method may further include processing, by the threat assessment computer program, the threat data, wherein the processing deduplicates, enriches and/or normalizes the threat data.

In one embodiment, the threat actor groups may be categorized based an objective or an operational motivation, the TTPs, a funding level and technical sophistication of the threat actor group, etc.

In one embodiment, the threat actor group category of interest may be identified based on an exposure of the organizational systems.

In one embodiment, the countermeasure may include at least one of a change in a control posture, a change in a policy, a hardware or software upgrade, a hardware or software patch, a network infrastructure or software change, and an access control list modification.

According to another embodiment, an electronic device may include a memory storing a threat assessment computer program and a computer processor. When executed by the computer processor, the threat assessment computer program causes the computer processor to: receive threat data comprising malicious cyber activity; identify a plurality of threat actor groups from the threat data, wherein each threat actor group may be associated with malicious cyber activity that is under common control of the threat actor group; calculate a threat actor sophistication score for each of the plurality of threat actor groups; calculate a key motivations and intent score for each of the plurality of threat actor groups; calculate a final threat score based on the threat actor sophistication score and the key motivations and intent score for each of the plurality of threat actor groups; rank the plurality of threat actor groups based on their final threat scores; prioritize Tactics, Techniques and Procedures (TTPs) for the threat actor groups based on the ranking; collect operational data from an organizational system; generate a threat model by applying the identified TTPs to the operational data; and deploy at least one countermeasure to the organizational system based on the threat model.

In one embodiment, the threat data may be received from an internal source and/or an external source.

In one embodiment, the threat assessment computer program may further cause the computer processor to categorize the threat actor group into a threat actor group category, wherein each threat actor group category identifies a threat category and sophistication of the threat actor group.

In one embodiment, the threat actor sophistication score may be based on a level of technical sophistication of the threat actor group.

In one embodiment, the countermeasure may include at least one of a change in a control posture, a change in a policy, a hardware or software upgrade, a hardware or software patch, a network infrastructure or software change, and an access control list modification.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for cybersecurity operations threat modeling.

Figure 1:
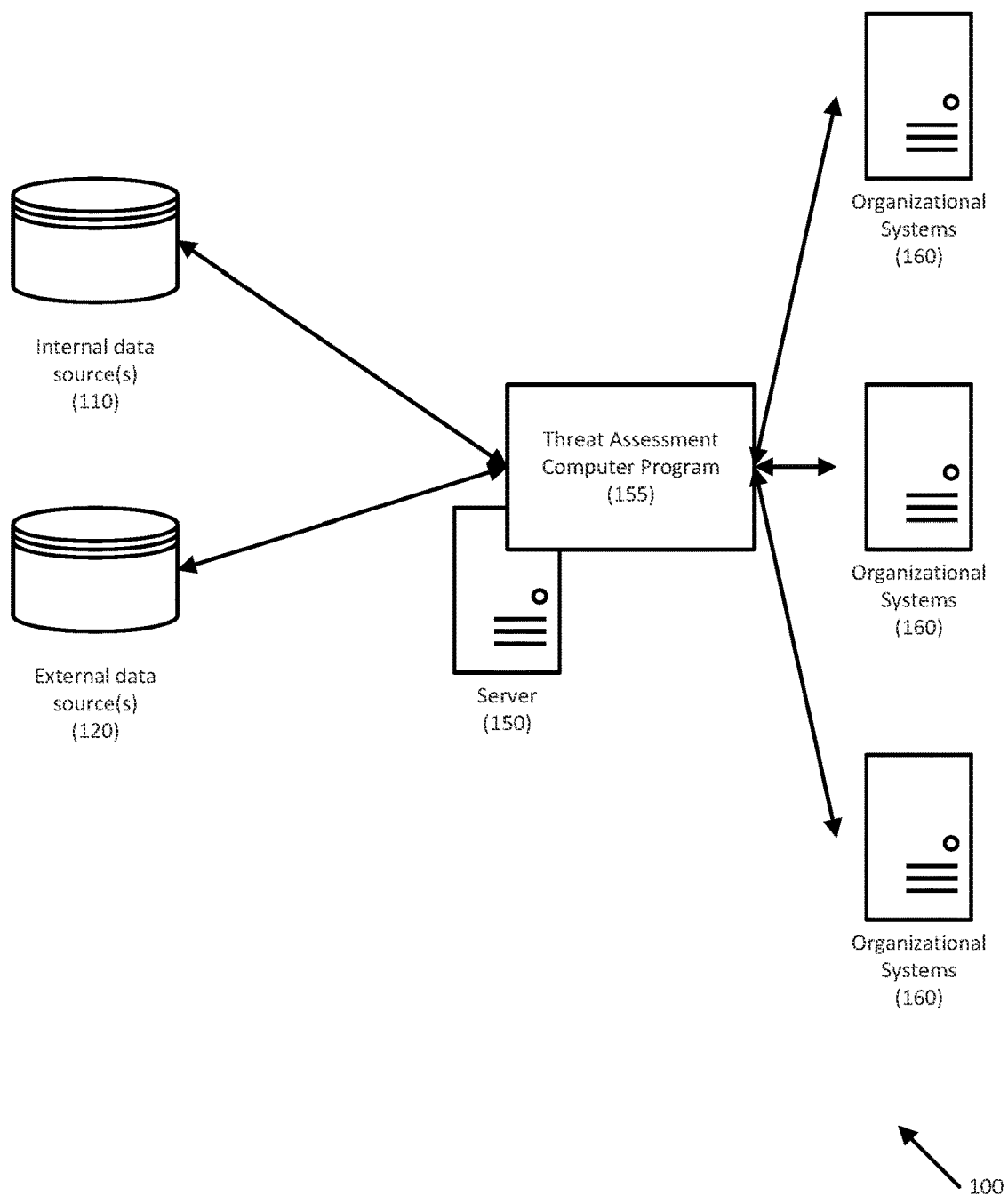
FIG. 1 depicts a system for cybersecurity operations threat modeling according to one embodiment.

Referring to FIG. 1, a system for cybersecurity operations threat modeling is disclosed according to one embodiment. System 100 may include one or more internal data sources 110 and one or more external data sources 120 that may provide information regarding threat actors and/or threat actor groups. The data may include identities, past attacks, associations, motivations, sponsors, nationalities, and any other information that may be useful in assessing the risk associated with a threat actor or a threat actor group.

As used herein, the phrases "threat actor" and "threat actor group" may be used interchangeably.

Data source(s) 110 and/or 120 may be cyber intelligence sources that may provide the threat actor data, such as governments, third party groups, etc.

A server 150 may execute a threat assessment computer program 155 that may analyze the threat actor data from data sources 110 and/or 120. In one embodiment, the server 150 may be one or more physical server, one or more cloud-based servers, combinations thereof, etc.

In one embodiment, the threat assessment computer program 155 may classify the threat actors and threat actor groups based on the threat actor data. This may be referred to as a threat actor grid.

Each classification may be associated with a threat actor profile.

In one embodiment, instead of classifying the threat actors and threat actor groups, a separate profile may be created for each of the threat actors and threat actor groups.

Threat assessment computer program 155 may communicate with one or more organizational system 160, which may receive operational data. Threat assessment computer program 155 may apply the threat actor profiles to the operational data and may generate a threat model. The threat model may then be applied to the organizational systems 160 in order to counteract any potential attacks.

Figure 2:
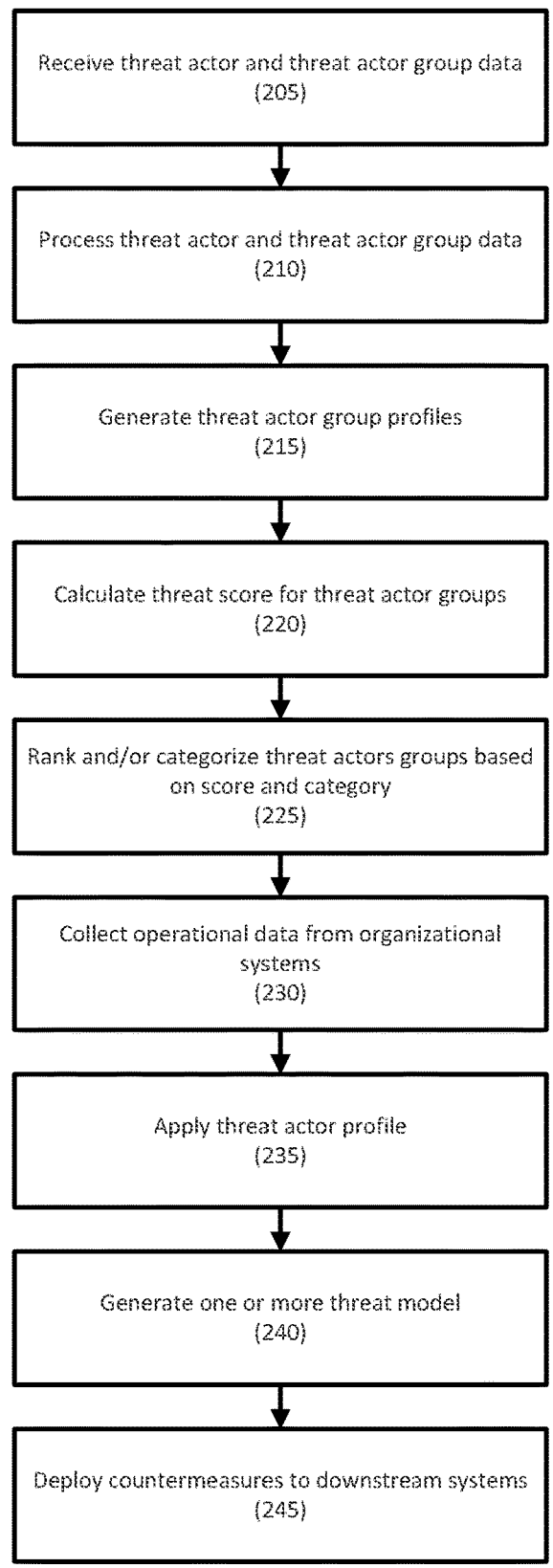
FIG. 2 depicts a method for cybersecurity operations threat modeling according to one embodiment.

Referring to FIG. 2, a method for cybersecurity operations threat modeling is disclosed according to one embodiment.

In step 205, a threat assessment computer program may receive threat data, such as threat actor and/or threat actor group data, from internal and/or external sources. In embodiment, the data may be received from, for example, paid vendor subscriptions, publicly accessible Internet resources, etc. The data may be technical or contextual in nature. In embodiments, the data may be ingested into a threat intelligence platform.

In step 210, the threat actor data may be processed by the threat intelligence platform which may de-duplicate, enrich, and normalize the data. It may further render the data into a human-readable format.

In step 215, the threat intelligence platform may generate one or more threat actor profiles. In one embodiment, the ingested data may be reviewed, validated, and corroborated to identify malicious cyber activity that appears to be under common control of a single threat actor group.

In embodiments, common control may be assessed by evaluating the available information in context. For example, if an objective aligns to a threat actor group's operational motivations, or if the same tactics, techniques, and procedures have been used by a threat actor group in the past, the activity may be presumed to be under common control of a single threat actor group. Similarly, if the activity in question appears to be coordinated and deliberate, then it may be presumed that the activity is under the common control of a single threat actor group.

Such activity may be further reviewed to determine uniqueness, overlap with pre-existing threat groups, and associations with other known threat actor aliases. In one embodiment, the nature of the cyber activity, the Tactics, Techniques and Procedures (TTPs) of the cyber activity, and the motivation behind the cyber activity may be reviewed to determine whether the activity is under common control.

Where the observed activity aligns to a pre-existing threat actor profile, it may be attributed to the extant threat actor profile. When the observed activity appears to be unique and not otherwise associated with a previously observed actor, the threat intelligence platform may generate a new threat actor/group profile. Threat actor/group profiles may include multiple categories for assessment including, for example, the operational motivation of the actor, the capability and sophistication of the actor, the countries or regions targeted by the actor, the industry sectors targeted by the actor, etc. Threat actor/group profiles may also include salient information germane to the TTPs deployed by the threat actor/group. Industry standard TTP nomenclature may be used.

Threat actors/groups may be classified into one or more designations, such as Threat Actor Group, Emerging Threat, etc. Other and/or additional designations may be used as is necessary and/or desired. The Threat Actor Group designation may be used when there is a high degree of confidence that the observed activity is under the common control of a single coherent entity. The Emerging Threat designation may be used when the observed activity appears to be related, but there is insufficient data to confidently attribute the activity to a single coherent entity. Activity designated as an Emerging Threat may subsequently be re-designated as a Threat Actor Group when new data become available that achieves the necessary degree of confidence.

Threat Actor Groups may be added to the threat intelligence platform so that data and the TTPs for the threat actor groups may be associated with them. Emerging Threats may not be added to the threat intelligence platform because it is not yet known whether the associated activity is under common control. In embodiments, when Threat Actor Groups are added to the threat intelligence platform, a consistent naming convention may be used. Metadata in the form of tags or similar may be added to denote aliases, targeted regions or sectors, TTPs used, and any other salient information.

In another embodiment, instead of classifying the Threat Actors and Threat Actor Groups, a separate profile may be created for each of the threat actors and threat actor groups.

In step 220, a threat score may be calculated. In one embodiment, the threat score may objectively assess and prioritize threats posed by Threat Actor Groups. The threat score may be numerical value, a letter grade, a color code (e.g., red-amber-green), etc.

In embodiments, to calculate the threat score, embodiments may calculate a threat actor sophistication score ($S_{TTP}$) that may score threat actors/groups based on their levels of technical sophistication. Technical sophistication may be assessed based on the threat actor/group's usage of TTPs from beginning to the end of Computer Network Operations (CNO) undertaken by them. CNO can be considered synonymous with a "cyber-attack" for the purposes of this document, and may be divided into seven stages using the industry standard Cyber Kill Chain®. The threat actor/group's level of sophistication may be assessed individually on each of these seven stages of the Cyber Kill Chain® and may be assigned a score for each stage. The seven stages of a Cyber Kill Chain® as used in this scoring methodology are described in the table below:

| | |
|---|---|
| Stage-1: Reconnaissance | Gathering information about the target and its infrastructure to understand the target environment and working practices to help plan the attack. For the purposes of this scoring exercise, reconnaissance performed by the threat actor/group on the target's infrastructure, process or personnel after Stage-4 (Exploitation) is also assessed. |
| Stage-2: Weaponization | Create exploits and couple them with a deliverable payload. This stage could involve weaponizing legitimate pieces of software into malicious ones by the threat actor/group for the purposes of the operation. |
| Stage-3: Lure/Delivery | Lure: depending on the nature of the target victim and the campaign, the target could be sent a 'Lure' most likely via email. This lure could contain a malicious payload or could redirect the target to a malicious website. Delivery stage send the weaponized payload from Stage-2 to the target via a delivery method such as email, SMS, compromised website etc. |
| Stage-4: Exploitation | The weaponized payload exploits vulnerability on the target victim's machine. The exploit stage might allow the actor to gain higher privileged access (known as "Privilege Escalation") to the target victim's system. |
| Stage-5: Installation | After exploiting vulnerability on the target's machine with possible escalation of privilege, one or malware are installed on the target machine. |
| Stage-6: Command & Control | Installed malware contacts an actor controlled machine which acts as a Command & Control (C&C) station. Malware communicates to the C&C machines to report status, to receive commands and/or to send exfiltrated data from the target victim's machine/network. |
| Stage-7: Action on target | Once malware have been installed on the target victim's machine and access to target assets gained, the threat actor/group performs actions such as data theft or surveillance or destructive operations as per their key intent behind the operation. |

The individual score value assigned to the threat actor/group on each stage of the Cyber Kill Chain® is an integer $S_i$ between 1 and 5 (inclusive). An average score $S_{TTP}$ may then be calculated by using the following formula:

$$S_{TTP} = \frac{\sum_{i=1}^{7} Si}{7}$$

The score value $S_{TTP}$ may be limited to one decimal point precision and may thus range between 0.0 and 5.0.

The key motivations and the resulting intent of each threat actor/group may also be assessed using a Threat Actor Key Motivations and Intent Score ($S_{KM}$). A single threat actor/group may have only one key motivation, or it may have multiple key motivations. Once all the key motivations of a threat actor/group have been assessed based on available information, a final assessment may be made to identify the most likely targeting intent of the threat actor/group in question. The final intent may then be scored against a security posture.

An exemplary scoring scheme is provided in the following table:

| Assessed Intent | $S_{KM}$ |
| --- | --- |
| Has the intent to launch a targeted attack against the organization directly, and is likely to invest significant resource into tailoring operations specifically towards the organization, with the explicit objective of compromising the organization? | 5 |
| Has the intent to launch a targeted attack against organizations in the same industry of similar size to the organization, and is likely to invest resource into tailoring its operations specifically towards such organizations? | 4 |
| Has the intent to any organizations in the same industry, regardless of size, and their customers, at scale? Attack vector (for example emails) routinely evade perimeter controls. Will devote some resource into tailoring operations to fit a certain victim profile, but ultimately relies on high volume targeting. | 3 |
| Has the intent to target organizations in the same industry and their customers at scale? Devotes minimal resource into tailoring its operations; attack vector is routinely blocked by perimeter controls. However, the volume of its operations require some level of mitigating activity. | 2 |
| Has the intent to conduct generic malicious cyber activity which is not targeted towards a specific sector or institution? Is unlikely to invest any significant resource into tailoring its operations, and does not show any intent to uniquely target the financial sector. | 1 |

The final Threat Score ($S_T$) may be calculated using the following equation:

$$S_T = S_{TTP} * S_{KM}$$

Since the Threat Actor Sophistication Score, $S_{TTP}$, has a range (0.0 ... 5.0) with one decimal point precision, and the Threat Actor Key Motivation and Intent Score $S_{KM}$ has a range (1 ... 5) and is a whole integer, the final Threat Score value $S_T$ has a range of (0.0 ... 0.25.0).

It should be noted that the range of scores, number of decimal places, etc. may be selected as is necessary and/or desired.

In step 225, each threat actor/group may be ranked based on the final Threat Score ($S_T$) and/or a threat category. For example, the threat actors/groups with the highest threat score may be prioritized over threat actors/groups with lower threat scores. In addition, or instead, threat actors/groups presenting a certain threat category that may be particularly relevant to an organization (e.g., criminal, espionage, type of threat actor/group, etc.) may be prioritized over other threat actors/groups. In embodiments, a combination of ranking by final threat score and categorization may be used.

For example, threat actors/groups may be categorized into one of eight threat actor/group categories. Other numbers of threat actor/group categories, descriptions, etc. may be used as is necessary and/or desired. Each category may be mutually exclusive, and each threat actor/group in the Threat Grid can only have one of the eight categories assigned at one time. An example of the different categories is as follows:

Category-1 Nation-State APT group: Advanced Persistent Threat group that enjoys highest possible funding and human resources in all disciplines; and are technically the most sophisticated. They are capable of operating undetected for a long time and can mount highly targeted operations while leaving little or no forensic artefacts behind.

Category-2 Nation-State APT group: An Advanced Persistent Threat group that is well-funded and resourceful but lacks the breadth and depth of technical understanding, knowledge, skills, engineering and logistical abilities compared to a Category-1 nation State APT. Nevertheless, Category-2 APTs are capable of running effective operations and achieving objectives but might not be as undetectable.

Category-3 APT group/Evolving Nation-State APT: An Advanced Persistent Threat group that is adequately resourced but lacks the advanced technical skills and/or engineering abilities as that of Category-1 or Category-2 Nation-State APT groups. A Category-3 Nation-State APT group utilizes less sophisticated techniques and lacks the ability to cause strategic damage or evade detection.

Category-1 Cyber Criminal group: An Organized Crime (OC) group conducting cyber operations primarily for financial gain and is highly organized, well-resourced and possess or able to resource technical skills and engineering abilities. A Category-1 Cyber Criminal group is capable of devising creative and innovative techniques to bypass existing security controls of their targets as well as displaying excellent Operational Security (OPSEC) and logistical capabilities.

Category-2 Cyber Criminal group: A Category-2 Cyber Criminal group is an Organized Criminal (OC) group that is adequately resourced but lacks the creative technical skills of a Category-1 Cyber Criminal group and are more of a second-generation follower rather than a pioneer.

Category-3 Cyber Criminal group: A Category-3 Cyber Criminal/group is not a well-organized group. Category-3 Criminal groups are opportunistic in nature and use already known tools, techniques and procedures. Category-3 Cyber Criminals are not well-resourced and rely on leveraging known exploits/social engineering attacks and/or commercial off-the-shelf malware.

Hacktivist Group: A Hacktivist group is an ideologically (e.g., political, socio-economical, nationalist, social-justice etc.) motivated group of individuals who select their targets based on their ideological views. A "Hacktivist Persona" is a threat group that molds its operations to emulate a Hacktivist group. Usually this is done as a thinly veiled attempt to mask the true nature of the operations, which could include a Nation-State sponsorship.

Hacktivist individual/low-skilled: Uses publicly available tools (e.g., distributions such as Kali, Metasploit etc.) and automation scripts developed by higher skilled people. Not usually knowledgeable enough or skilled enough to re-engineer toolset to enhance their effectiveness.

Note that additional, fewer, or different categories may be used as is necessary and/or desired.

In step 230, operational data may be collected from one or more organizational systems, and in step 235, the threat actor/group profile(s) for may be applied to the operational data based on the ranking and/or categorization. For example, a threat model may apply the threat actor/group category and final threat score to the operational data to identify systems or assets that may be at a higher risk of compromise. Operational data gathered from one or more organizational systems may reviewed against the TTPs employed by the threat actors/groups based on the ranking and/or categorization to identify control deficiencies and opportunities for enhanced risk mitigation.

In step 240, a threat model for the organizational system(s) may be generated, and, in step 245, the threat model may be used to implement or deploy countermeasures to the threat. Such countermeasures may include but are not limited to changes in control postures, policies, standards, hardware or software upgrades or patches, network infrastructure or software changes, or access control list modifications.

In one embodiment, the efficacy of the countermeasures may be monitored through operational control metrics that are appropriate to the network infrastructure and technology assets used.

Although several embodiments have been disclosed, it should be recognized that these embodiments are not exclusive to each other, and certain elements or features from one embodiment may be used with another.

Additional details and exemplary embodiments are disclosed in the attachments, which are hereby incorporated, by reference, in their entireties.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for cybersecurity operations threat modeling, comprising:

receiving, by a threat assessment computer program, threat data comprising malicious cyber activity;

identifying, by the threat assessment computer program, a plurality of threat actor groups from the threat data, wherein each threat actor group is associated with malicious cyber activity that is under common control of the threat actor group;

calculating, by the threat assessment computer program, a threat actor sophistication score for each of the plurality of threat actor groups, wherein calculating the threat actor sophistication score comprises:
assigning one of a plurality of score values within a predetermined value range to the threat actor group for each of a set of stages describing escalations of the malicious cyber activity; and
determining the threat actor sophistication score based on an average of the score values;

calculating, by the threat assessment computer program, a key motivations and intent score for each of the plurality of threat actor groups;

calculating, by the threat assessment computer program, a final threat score based on the threat actor sophistication score and the key motivations and intent score for each of the plurality of threat actor groups;

ranking, by the threat assessment computer program, the plurality of threat actor groups based on their final threat scores;

prioritizing, by the threat assessment computer program, Tactics, Techniques and Procedures (TTPs) for the threat actor groups based on the ranking;

collecting, by the threat assessment computer program, operational data from an organizational system;

generating, by the threat assessment computer program, a threat model by applying the identified TTPs to the operational data; and deploying, by the threat assessment computer program, at least one countermeasure to the organizational system based on the threat model.

2. The method of claim 1, wherein the threat data is received from an internal source and/or an external source.

3. The method of claim 1, further comprising:
processing, by the threat assessment computer program, the threat data, wherein the processing deduplicates, enriches and/or normalizes the threat data.

4. The method of claim 1, wherein the final threat score represents a threat level posed by the threat actor group.

5. The method of claim 1, further comprising:
categorizing, by the threat assessment computer program, the threat actor group into a threat actor group category, wherein each threat actor group category identifies a threat category and sophistication of the threat actor group.

6. The method of claim 1, wherein the threat actor sophistication score is based on a level of technical sophistication of the threat actor group.

7. The method of claim 1, wherein the countermeasure comprises at least one of a change in a control posture, a change in a policy, a hardware or software upgrade, a hardware or software patch, a network infrastructure or software change, and an access control list modification.

8. A method for cybersecurity operations threat modeling, comprising:
receiving, by a threat assessment computer program, threat data comprising malicious cyber activity;
identifying, by the threat assessment computer program, a plurality of threat actor groups from the threat data, wherein each threat actor group is associated with malicious cyber activity that is under common control of the threat actor group;
calculating, by the threat assessment computer program, a threat actor sophistication score for each of the plurality of threat actor groups, wherein calculating the threat actor sophistication score comprises:
assigning one of a plurality of score values within a predetermined value range to the threat actor group for each of a set of stages describing escalations of the malicious cyber activity; and
determining the threat actor sophistication score based on an average of the score values;
categorizing, by the threat assessment computer program, each threat actor group into a threat actor group category based on at least the threat actor sophistication score;
prioritizing, by the threat assessment computer program, Tactics, Techniques and Procedures (TTPs) for the threat actor groups based on the categorization;
identifying, by the threat assessment computer program, a threat actor group category of interest;
collecting, by the threat assessment computer program, operational data from an organizational system;
generating, by the threat assessment computer program, a threat model by applying the identified TTPs to the operational data; and
deploying, by the threat assessment computer program, at least one countermeasure to the organizational system based on the identified threat actor group category.

9. The method of claim 8, wherein the threat data is received from an internal source and/or an external source.

10. The method of claim 8, further comprising:
processing, by the threat assessment computer program, the threat data, wherein the processing deduplicates, enriches and/or normalizes the threat data.

11. The method of claim 8, wherein the threat actor groups are categorized based an objective or an operational motivation.

12. The method of claim 8, wherein the threat actor groups are categorized based on the TTPs.

13. The method of claim 8, wherein the threat actor groups are categorized based on a funding level and technical sophistication of the threat actor group.

14. The method of claim 8, wherein the threat actor group category of interest is identified based on an exposure of the organizational systems.

15. The method of claim 8, wherein the countermeasure comprises at least one of a change in a control posture, a change in a policy, a hardware or software upgrade, a hardware or software patch, a network infrastructure or software change, and an access control list modification.

16. An electronic device, comprising:
a memory storing a threat assessment computer program; and
a computer processor;
wherein, when executed by the computer processor, the threat assessment computer program causes the computer processor to:
receive threat data comprising malicious cyber activity;
identify a plurality of threat actor groups from the threat data, wherein each threat actor group is associated with malicious cyber activity that is under common control of the threat actor group;
calculate a threat actor sophistication score for each of the plurality of threat actor groups, wherein the threat actor sophistication score is calculated by:
assigning one of a plurality of score values within a predetermined value range to the threat actor group for each of a set of stages describing escalations of the malicious cyber activity; and
determining the threat actor sophistication score based on an average of the score values;
calculate a key motivations and intent score for each of the plurality of threat actor groups;
calculate a final threat score based on the threat actor sophistication score and the key motivations and intent score for each of the plurality of threat actor groups;
rank the plurality of threat actor groups based on their final threat scores;
prioritize Tactics, Techniques and Procedures (TTPs) for the threat actor groups based on the ranking;
collect operational data from an organizational system;
generate a threat model by applying the identified TTPs to the operational data; and
deploy at least one countermeasure to the organizational system based on the threat model.

17. The electronic device of claim 16, wherein the threat data is received from an internal source and/or an external source.

18. The electronic device of claim 16, wherein the threat assessment computer program further causes the computer processor to categorize the threat actor group into a threat actor group category, wherein each threat actor group category identifies a threat category and sophistication of the threat actor group.

19. The electronic device of claim 16, wherein the threat actor sophistication score is based on a level of technical sophistication of the threat actor group.

20. The electronic device of claim 16, wherein the countermeasure comprises at least one of a change in a control posture, a change in a policy, a hardware or software upgrade, a hardware or software patch, a network infrastructure or software change, and an access control list modification.

* * * * *